US008117090B2

(12) United States Patent
Romero (10) Patent No.: US 8,117,090 B2
(45) Date of Patent: Feb. 14, 2012

(54) MOTOR VEHICLE REMARKETING SERVICE

(76) Inventor: Craig Duncan Romero, Palm Coast, FL (US)

(*) Notice: Subject to any disclaimer, the term of this patent is extended or adjusted under 35 U.S.C. 154(b) by 345 days.

(21) Appl. No.: 12/455,463

(22) Filed: Jun. 2, 2009

(65) Prior Publication Data

US 2009/0271296 A1 Oct. 29, 2009

Related U.S. Application Data

(63) Continuation-in-part of application No. 11/343,184, filed on Jan. 30, 2006, now abandoned.

(51) Int. Cl.
*G06Q 30/00* (2006.01)
(52) U.S. Cl. .............. 705/27.1; 705/26.1; 705/26.41
(58) Field of Classification Search ............ 705/26, 705/27
See application file for complete search history.

(56) References Cited

U.S. PATENT DOCUMENTS

| | | | | |
|---|---|---|---|---|
| 6,587,838 B1* | 7/2003 | Esposito et al. | ............ | 705/7.29 |
| 6,853,979 B1* | 2/2005 | Bass | ............ | 705/27.1 |
| 2001/0034690 A1* | 10/2001 | Joseph | ............ | 705/37 |
| 2002/0049663 A1* | 4/2002 | Kahana | ............ | 705/37 |
| 2002/0169640 A1* | 11/2002 | Freeland | ............ | 705/4 |
| 2003/0220812 A1* | 11/2003 | Jones et al. | ............ | 705/1 |
| 2004/0107160 A1* | 6/2004 | Goclowski | ............ | 705/37 |
| 2004/0143490 A1* | 7/2004 | Kelly et al. | ............ | 705/13 |
| 2005/0049917 A1* | 3/2005 | Fink | ............ | 705/14 |
| 2006/0074790 A1* | 4/2006 | Anspach | ............ | 705/35 |

OTHER PUBLICATIONS

Car Fair: Internet Archive Wayback Machine, www.archive.org. www.carfair.co.uk; Aug./Oct. 2003; 20pgs.*
Ruppert, James, "Motoring: take the stress out of selling that car ...," The Independent, Nov. 29, 2003; Proquest # 467402891, 4pgs.*
Hans, Jennifer Dawn; "Car wash wonderland," Business People, May 1, 2004, Proquest #661496191, 4pgs.*
PRN: "BestOffer.com and Recycler.com . . . ," PR Newswire, Jun. 2000, Dialog file 621 #02524875, 3pgs.*
How Facial Recognition Systems Work by Kevin Bonsor and Ryan Johnson, http://www.howstuffworks.com/facial-recognition.htm/printable.

* cited by examiner

*Primary Examiner* — Robert M. Pond (57) ABSTRACT

A method in combination with a nationwide alliance of professional car care service providers for remarketing privately owned motor vehicles. Successfully registered sellers present their privately owned motor vehicles at a participating professional car care service provider for processing into the system. The computer-implemented system employs a method based on three-dimensional facial image technology in combination with personal relational identifiers to monitor, identify, isolate, ban, and enforce the express prohibition of used car dealer, used car broker, and curbstoner participation within the system, in any fashion. The service is national in its reach while local in its execution, and provides a national platform for green-marketing the benefits of professional car care versus individual car care alternatives.

3 Claims, 8 Drawing Sheets

MOTOR VEHICLE REMARKETING SERVICE

CROSS-REFERENCE TO RELATED APPLICATIONS

This application is a Continuation-in-Part (CIP) of U.S. application Ser. No. 11/343,184, entitled "Motor Vehicle Remarketing Service," filed on Jan. 30, 2006 now abandoned, which is hereby incorporated by reference in its entirety for each of its teachings and embodiments.

FIELD OF THE INVENTION

The invention relates to a computer-implemented system and method for marketing privately owned motor vehicles.

BACKGROUND OF THE INVENTION

The used car market is an inefficient, fragmented market. The current state of the market presents the consumer with a daunting choice of soliciting the services of a used car dealer or used car broker; placing a for-sale-signed motor vehicle in a public or private locale to draw response from local traffic; employing the utility of conventional classified advertisement through print media; and/or employing the utility of online classified advertisement or auction through a website or website-only method of service.

Used car dealers top a list of 15 professions and industries that consumers believe consistently mislead or try to take advantage of them. Dealers are perceived as swindlers, and the cars as lemons, with no possible way to avoid being ripped off. Such perception is not without good cause. A trade-in may subject the consumer to an even greater loss. Moreover, car buyers who trade in their old vehicles and count on the dealer to retire their outstanding loans occasionally discover later that the dealer has done no such thing. Suddenly, they're stuck with payments, not only on their new cars or trucks but on ones they thought they'd gotten rid of. And woe to those who unwittingly buy a used car with an unpaid loan lurking in its history. They might just lose it to the repo man. People know there are dishonest car dealers out there. Many dealerships prey on the unprepared. It's the consumers who ultimately pay the price for not knowing where to shop for the best car, how to negotiate, and how to protect themselves from predatory practices. At the very least, the car business may appear to be an opportunistic enterprise. But with limited alternatives, consumers have continued to solicit such services.

The used car dealer is considered by some to be quite creative in bringing new versions of the same old scam, the latest one being the so-called Certified Pre-Owned motor vehicle. Technically, certification is the same thing as a warranty. A certified vehicle is one that has passed a series of published tests by the seller who is willing to support the inspection with a warranty. Critics complain that it's a marketing ploy, a sleight-of-hand trick that gets the consumer to pay for a useless piece of paper. On average, luxury buyers paid nearly $3,000 more for their certified used vehicle than did buyers of non-certified luxury brands, while non-luxury buyers paid $1,000 more, for what may amount to nothing more than a piece-of-mind premium. A reasonable conclusion may be that consumers should not be spending billions of dollars a year for a perceived benefit that does not exist. Certified used-car programs are coming under increasing attack from consumer advocates and lawmakers. In this light, the consumer must also be cautious of dealer-offered extended warranty plans. They are often too expensive and offer too little protection.

Another alleged piece-of-mind gimmick incorporated and touted by the used car dealer is a provider of vehicle history information. It genuinely appears that consumer protection is the business of Carfax® as the company demonstrates an ongoing concern to address elements of industry fraud, and promotes consumer awareness. The problem lies not with Carfax and its progeny but with the willful or otherwise failure of insurance companies and the states' Department of Motor Vehicles (DMV) to report and document motor vehicles with a tainted history. Moreover, once vehicle damage is documented on a title, subsequent removal of such disclosure defeats the purpose.

A Consumer Reports® six-month investigation found that there's no way for consumers to know for sure the history of a used vehicle and, overall, 30 percent of vehicles that had been totaled after a fatal accident and then put back on the road with a title that disclosed the damage had that disclosure subsequently removed.

Mercenary auto insurance adjusters and inspectors may stimulate the criminal element of auto salvagers, who actively seek to obtain totaled or major-damaged, high-resale-valued motor vehicles where titles may be washed and placed back into the used car market. Dealers, whether willingly or unknowingly, accept such motor vehicles onto their lots with the Carfax-clean seal of approval, making illegitimate profits at the expense and safety of the consumer. The problem is rampant. To make matters worse, the consumer who has purchased a totaled or major-damaged motor vehicle from a dealer usually has little recourse. The consumer without good vision and legal expertise is subject to have glossed over the fine print in a binding contract and, unknowingly, sign off on a right to sue in a court of law. Thus, the consumer with a legitimate complaint is usually forced into arbitration, which is presumed to have little, if any, effect on an unscrupulous dealer's motis operandi.

Given an informed choice, the smart consumer may more likely be willing to accept the risk of a private transaction with an "as is" motor vehicle (of course, with the option of securing a pre-purchase vehicle inspection by an independent mechanic—a course of action costing roughly $75 to $150 that can save consumers thousands of dollars down the road) than to engage an arms-length deal with a used car dealer for an alleged Carfax-clean, so-called Certified Pre-Owned motor vehicle with a substantially higher price and risk for a comparative motor vehicle. This is not to imply that a vehicle history check should be abandoned in a private transaction—a private transaction simply may reduce the risk that Carfax® or any other competitive vehicle history reporter may be implemented by an unethical dealer for the perpetration of fraud.

It's universal—car shoppers like private deals. Nevertheless, the smart consumer must proceed with caution in a private transaction. The appearance of a private transaction may be nothing more than a curbstoner's deception. Old-economy curbstoners operate on the curb with for-sale-signed motor vehicles, but a growing number favor the Web, where it's easier for sellers to conceal their identity and location from unsuspecting buyers. When buying a used car, it is always advisable to take the car to a trusted, independent mechanic for evaluation. If the seller, since this applies to private sales as well, won't allow your mechanic to inspect the car, walk away quickly.

Notwithstanding dealer profits made in the so-called Certified Pre-Owned program, independent dealers reportedly make an average retail profit at $489 per unit. Although such an amount is not unreasonable, in and of itself, commissions increase considerably when financing is arranged and even bigger when cash back is sold.

A used car broker may be considered as an alias for the used car dealer, as most used car brokers are actually licensed used car dealers. Over the years, used car brokers have morphed into almost every conceivable variation of middleman or woman in the perpetual effort to maximize profit at the consumer's expense. Prior art discloses that the used car broker, also known as the used car dealer, attempts to blur its identity by employing yet additional titles or name changes. The used car broker now claims to be an agent and/or system agent, among others. The used car broker intends to make a substantial profit at the expense of the consumer.

Placement of a for-sale-signed motor vehicle in a public or private locale to draw response from local traffic is a method commonly employed by the consumer in this fragmented market. Several inferior characteristics exist in the utility of this method in common with other methods comprehensively described and fully addressed below. The most apparent drawback to such a method may be the limited amount of exposure the motor vehicle ultimately receives. This may result in a limited and belated response (if any). While a seller may employ this method to avoid associated costs and expenses of placing a motor vehicle on the market by alternative methods, the limited exposure and dilatory response may ultimately have a contrarily profound effect upon the final sale price.

Conventional classified advertisement through print media possesses several inferior characteristics. The used car marketing process can be a long and complicated one when utilizing print media. Advertisement through the classified section of a local or national newspaper is a typical example. Newspaper automotive classifieds are narrowly focused with limited market area. The initial ad placement process is inconvenient, at best, consuming a substantial amount of time. The inconvenience is compounded by the traditional amount of time that must be normally invested by consumers while searching for a motor vehicle of interest, and making initial contact as well as the subsequent making of time-and-location arrangements for inspection, negotiation, and the final exchange. The tangible value is minimal while advertisement space is sold at a premium. Brand name recognition and image is nonexistent as is the case of consumer loyalty.

Over the last few years, there has been a massive audience shift toward the Internet. Online campaigns are stealing ad share from newspapers. Among Internet users, 11 percent said they found the used car they ultimately bought online, while only 9 percent said they found their car in a newspaper classified.

Auto Trader® Magazine and its progeny is an example of as-good-as-it-gets with print media for the consumer rejecting the idea of an arms-length experience with a used car dealer. The only page available for placement of a picture in full color is the front page which holds four listings. It is available on a weekly basis at a premium price. Placement of gray-scale half-tone, single-sized, double-sized, and four-time-sized pictures can be accomplished on a two-week, twelve-week, and unlimited basis. In sales, a great picture can say a thousand words. In the case of Auto Trader® Magazine, although all advertisement space is sold at a premium, the pictures (with the exception of the front cover) are of such poor quality that they serve no legitimate purpose other than to help identify the make and model of motor vehicle advertised for sale.

A consumer wishing to place a motor vehicle for sale with Auto Trader Magazine can choose to schedule an appointment, free of charge, with a photographer to visit one's home or office, or to visit the company's office or a local Photo Express Center and have them take the photo. Regardless of choice, the consumer can expect to experience the inconvenience of awaiting the arrival of a photographer at the consumer's location of choice or loss of time during a, sometime, tumultuous search while driving to an unbranded Photo Express Center (no Auto Trader® signage) sparsely established in local areas, such as oil change/quick lube shops, motor vehicle aftermarket parts stores, car washes, and print shops, to name a few. This inconvenience is relevant to the initial placement of a motor vehicle for sale on Auto Trader® Magazine. The inconvenience is compounded by the traditional amount of time that must be normally invested when utilizing print media, as mentioned in the prior example of placement of an advertisement in a classified section of a newspaper. Moreover, in the event the motor vehicle has been sold, the seller usually becomes the recipient of late inquiries from consumers due to the nature of dated listings inherent in print media. Unlike Auto Trader Magazine, newspapers, and their progeny, the invention strictly provides real-time-inventory. Once sold, the listed motor vehicle shall be removed from the database, forthwith.

Finally, it is clear that Auto Trader® Magazine and its offspring (including the online version) is dealer-driven—40,000 dealers with more than 2.25 million listings versus 250,000 listings by private parties. This may amount to lost time for buyers searching through dealer trappings for the minority listings of privately owned motor vehicles, a substantial number of which may be dated, as addressed above.

Since 1999 the person-to-person auto sales have risen 20% going from 11,448,430 units to over 13,668,383 units in 2003, while used car sales by New Car Dealers have declined. A major concern may exist for the security of consumers who choose to engage a private transaction for the sale or purchase of a motor vehicle. Most consumers may prefer to meet at a location other than their personal residences. In particular, sellers who live alone, or who feel vulnerable in some way, may be unwilling to open up their garages, and perhaps their homes, to strangers shopping for used cars. This may leave the proverbial meeting ground out in the street where bad things can happen. Women may be particularly vulnerable who act alone or have a say in roughly 80 percent of all vehicle purchases. In consideration of consumer safety and crime prevention, consumers may: not invite an unknown buyer to the home; not meet the seller in an unsafe location; choose a safe, neutral meeting ground in a public location; inspect all vehicle numbers for a match—VIN and license plate; be sure that both buyer and seller possess a valid driver license and photo; be sure that both buyer and seller possess a valid insurance card; compare the seller's driver license information to the vehicle registration; not consider a test drive until confidence in the buyer is legitimate; then leave identification information on both with someone who is not going on the test drive—copies if possible.

The evolution of the Internet has made way for a new reality in used-car shopping. First off, know that most of the online sites are a lot alike, so much so that it's sometimes hard to tell them apart, thus, what ultimately separates one site from the next is its network of dealers. Most of these sites are referral services that simply take your name and pass it on to a dealer. Apparently, the Internet has proven to be a good place for dealers to nab customers.

There seem to be an almost endless number of websites that promote various methods in the marketing of motor vehicles.

AutoTrader.com is a major player in the marketing of used vehicles although it has become fertile ground for scams. Automart.com claims to be the Internet's largest automotive website featuring used car listings exclusively from dealers. Of course, the consumer can always elect to pursue online car auctions. But in doing so, the consumer must accept a considerable risk in becoming a victim of fraud.

Dennis Berry, former president and CEO of Manheim Auctions, Inc., believes that his company has the best model. Mr. Berry was correct in stating that "physical infrastructure is integral to the process of buying and selling used cars," thus, "[a] pure dotcom with no physical infrastructure or preexisting relationships—is naïve." And it appears that the worldwide web does not remove the tedious and tension-filled give and take traditionally demanded to strike a good deal. But the Manheim Auctions, Inc., model may still miss the point. It appears that the model may be flawed by incorporation of the dealer. Mr. Berry stated, "A lot of dotcoms say, 'We're going to bypass dealers. Consumers don't like doing business with dealers.' We knew that wouldn't happen—..." The invention herein contradicts Mr. Berry's former prediction.

The Internet, the world-wide web, and electronic commerce appear to have brought regions together to create a national networked economy.

The emergence of online markets and electronic business appear to have an effect on market structures, supply chains and company performance. The fact that the cost of information and communication continues to decline appears to have increased market transparency on some level, and speed of reaction reaches hitherto unknown dimensions. Electronic commerce particularly appears to be having a significant effect on the automobile industry where mergers, acquisitions, and changing-brands are in the news on a global scale. But, while any electronic commerce venture may bring a number of key success factors into play, problems can still arise.

More than half of car buyers use the Internet for research, but most close the deal the way it's always been done: face to face. The direction for the future of car sales lies not in a completely faceless car-buying process, but in service and convenience . . . people have the money to buy cars; they just don't want to be had.

Bricks and clicks is a business strategy or business model in e-commerce by which a company attempts to integrate both online and physical presences. It is also known as click-and-mortar or clicks-and-bricks. Under the right circumstances, vision, and management, the leveraging-advantages of such a model can be quite profound. Such a model can lay the groundwork for the ultimate brand. Strategic branding is the essence of a successful business. A brand is the sum, in the consumer's mind, of the personality, presence, and performance of a given product or service.

A professional car care industry as classified with the United States Department of Commerce, Bureau of Census, Economic Census, North American Product Classification System (NAPCS), Sector 81—Other Services (Industries arranged by NAICS Sectors), specifically NAICS Code 811192 includes: Automotive Detailing Services (i.e., cleaning, polishing); Automotive Washing and Polishing; Car Detailers; Car Washes; Detailing Services (i.e., cleaning, polishing), Automotive; Mobile Car, Truck and Bus Washes; Self-Service Carwash; Truck and Bus Washes; and; Waxing and Polishing of Motor Vehicles.

The professional car care industry offers a variety of services, consisting of: Full-Service; Full-Service Conveyor; Detailing; Full-Service Detailing; Express Detailing; Exterior-Only; Exterior-Only Conveyor; In-Bay Automatic; Self-Service; Convenience Store; Gasoline; Oil Change/Quick Lube; Truck Rental; Oil Company Car Wash; Paintless Dent Repair; Gold Plating; Windshield Repair; Hand Car Wash; Window Tinting, and; Vinyl/Leather Repair, according to the professional car care industry.

It is estimated that there are 75,000 car washes in North America where consumers spend more than $22.2 billion annually to have their vehicles professionally cleaned.

A professional car care enterprise has a division strictly dedicated to servicing dealerships in the automotive industry—new and used car dealerships, Internet auto sales companies, auto auctions, manufacturers, and on-site auto shows, as well as dealerships for RVs, boats, trucks, motorcycles and new farm equipment.

The professional car care industry idealizes itself as the better solution in consistency with ecological and environmental concerns, that is to say, the industry green-markets the benefits of pollution control and water conservation through its use versus individual car care alternatives. The Environmental Protection Agency (EPA) also recognizes the environmental benefits of professional car care. But many consumers are still price conscious and driveway washing regularly.

Thus far, the professional car care industry has been unable to develop a meaningful, far-reaching method to promote its ecological and environmental benefits to the public, at large, even though concern about the environment encourages buying products and services that are ecologically friendly and reduce pollution. Providing such information and education still represents the biggest opportunity to expand the market to mainstream consumers.

SUMMARY OF THE INVENTION

The following presents a simplified summary of the disclosure in order to provide a basic understanding of some aspects of the disclosure. This summary is not an extensive overview of the disclosure. It is intended neither to identify key or critical elements of the disclosure nor to delineate the scope of the disclosure. Rather, its primary purpose is merely to present one or more concepts of the disclosure in a simplified form as a prelude to the more detailed description that is presented later.

The present invention facilitates the remarketing of privately owned motor vehicles by a system and method means in a novel and unobvious combination with a nationwide alliance of professional car care enterprises.

More particularly, the system and method in combination with a nationwide alliance of professional car care enterprises can enable the remarketing of a privately owned motor vehicle by: registering by a consumer, personal identification information with a participating service provider at a professional car care enterprise within the nationwide alliance of professional car care enterprises; presenting by a successfully registered consumer, a motor vehicle, along with documents showing proof of private ownership, to a participating service provider at a professional car care enterprise within the nationwide alliance of professional car care enterprises; verifying by the service provider, private ownership of said motor vehicle by visually comparing for a match of consumer identity on all consumer documents, including the VIN (Vehicle Identification Number) physically located on the motor vehicle in manufacturer designated areas, to the VIN as indicated on consumer documents; washing, detailing or, otherwise, prepping by said service provider using the facilities of said professional car care enterprise, said motor vehicle; taking by said service provider using a digital camera, digital pictures of said washed, detailed or, otherwise, prepped, motor vehicle; taking by said service provider using the digital camera, a digital picture of the VIN physically located on the motor vehicle in manufacturer designated areas; recording and formatting by said service provider using a computer-implemented workstation, motor vehicle descriptive information, including consumer, hereinafter described as "seller," contact information; transforming by said service provider using the computer-implemented workstation, said information into data representation and; uploading into the computer-implemented system by said service provider using said computer-implemented workstation, said data representation of the motor vehicle information, seller contact information, digital pictures of the washed, detailed or, otherwise, prepped motor vehicle, and digital pictures of the VIN physically located on said motor vehicle in manufacturer designated areas.

A seller can be eligible for participation with the system and method only if seller, first, successfully completes a personal identification registration process and, secondly, qualifies by providing proof of ownership of the motor vehicle presented to a participating service provider, as matching identity of seller on all documents presented along with the motor vehicle, and with the VIN physically located on said motor vehicle presented.

All consumers can have limited access to the computer-implemented system website by employing a personal or other computing device to browse and/or search for a motor vehicle of interest and, in its best mode, no consumer may access a motor vehicle seller name or contact information unless or until the consumer successfully registers with the system.

Consumer registration can be accomplished in order to have unlimited access to the computer-implemented system website. Consumer registration can consist of personal identifiers including driver license number and personal photographic identification, and can also include a three-dimensional facial image associated with a driver license number and/or other relational identifier.

Once successfully registered, a buyer (as well as a seller) can be issued a website login password and/or other identifier allowing access to seller name and contact information in the system by employing a personal or other computing device. Once locating a particular motor vehicle of interest within said system, the buyer can retrieve the contact information provided by the seller, and use said contact information to contact the seller. Buyer and seller can subsequently arrange a meeting at the participating professional car care enterprise during normal business hours, for inspection of the motor vehicle, test-drive, negotiation, and final exchange.

OBJECTS AND ADVANTAGES

Accordingly, several objects and advantages of the present invention are: a long desired, value-added solution—a nation-wide, consumer-driven service whereby the consumer can arrive at true market value for a given motor vehicle by means of exclusive, real-time-inventory listings of privately owned motor vehicles; a long desired, value-added solution—a quick, convenient, one-stop process for initiating the placement of a privately owned motor vehicle on the market; a long desired, value-added solution—a relatively safe, neutral meeting ground for contact, inspection, negotiation, and the final exchange; a long desired, value-added solution—a service incorporating express prohibition with monitored enforcement against used car dealer, used car broker, and curbstoner participation within system, in any fashion.

Further objects and advantages of the invention become apparent from consideration of the ensuing description.

DEFINITIONS

The following terms used herein are suggested to have the following meanings. This is not intended as an exhaustive list of defined terms, but only as an interpretive aide for facilitating the reading and comprehension of the disclosure described herein. The definitions provided herein are intended to be coupled with the other sources of interpretive guidance for these terms, such as context, common usage in the field of art, and ordinary usage in the English language.

"Motor Vehicle" refers to a self-propelled wheeled conveyance, such as a car or truck that does not ride on rails.

"Internet" refers to an interconnected system of networks that connects computers around the world via the TCP/IP protocol.

"World-Wide Web" refers an Internet client-server hypertext distributed information retrieval system which originated from the CERN High-Energy Physics laboratories in Geneva, Switzerland.

"Electronic Commerce" refers to the conducting of business communication and transactions over networks and through computers. As most restrictively defined, electronic commerce is the buying and selling of goods and services, and the transfer of funds, through digital communications. However EC also includes all inter-company and intra-company functions (such as marketing, finance, manufacturing, selling, and negotiation) that enable commerce and use electronic mail, EDI, file transfer, fax, video conferencing, workflow, or interaction with a remote computer. Electronic commerce also includes buying and selling over the World-Wide Web and the Internet, electronic funds transfer, smart cards, digital case (e.g., Mondex), and all other ways of doing business over digital networks.

"System" is suggested to mean a computing device configured as a server, a client, a central database, a relational database, an input module, an output module, electronic commerce, a motor vehicle listings archive database, a consumer registration database, a three-dimensional facial images database, an active motor vehicle listings database, a computation module, a selection module, a data batching module, a data indexing module, a data processing module, a threshold module, an analyzer module, a three-dimensional facial image recognition and comparison technology module, a search engine module, a status indicator module, a display module, a three-dimensional facial image capture and recognition technology system kiosk, an Internet kiosk, etc. The details are not important, so long as the computer-implemented system is configured to execute the processor instructions and perform the methods to achieve the desired functional result.

"Computer Data Signal Embodied In A Carrier Wave" is suggested to mean a carrier wave encoding computer-usable data and transmitted to a computer via a carrier wave. The carrier wave may comprise a communications transmission in a communications medium, which may be optical, sonic, electronic, magnetic, etc. At a higher level, the communications medium may comprise (for instance) a computer network, such as the Internet; a cellular network; a data connection inside a computer, such as a ribbon cable that carries data in electronic form; a magnetic signal generated from a magnetic platter of a hard disk drive that stores the instructions; or an optical signal generated by reflecting a light source, such as a laser, off of an optical platter, such as a CD-ROM, that produces variable reflectivity representing information corresponding to the stored data. The data might comprise, for instance, audio data that the computer may use to produce specific sounds; it may comprise visual data that the computer may use to produce specific pictures or movies; etc. Additionally or alternatively, the data might comprise a set of computer instructions for achieving a useful result. The computer to which the computer data signal is transmitted may be configured to execute the instructions and perform the method; it may transform the instructions into a different form of processor-executable instructions (e.g., by receiving source code from the carrier signal and compiling it into a machine-executable binary); it may transmit the instructions to a second computer in order to configure the second computer to execute the instructions; it may store the instructions for later use by the same or another computer; etc. The details are not important, so long as the carrier wave encodes computer-usable data and may be transmitted to a computer via a carrier wave.

"Processor-Executable Instruction" is suggested to mean an instruction selected from an instruction set that is able to operate a computer processor to achieve a desired functional result. The desired functional result may be simple, such as the storage of a value in memory, or complex, such as an invocation of an advanced programming interface (API) call that produces sophisticated functionality. The instruction set may be any suitable processor-executable instruction set, including (without limitation) a native machine architecture language, machine language, Java, JavaScript, BASIC, Visual BASIC, C, C++, C#, FORTRAN, Perl, a command shell scripting language, etc. The instruction set may be declarative, such as HTML; imperative, such as C; a hybrid language; another type of instruction set; etc. The instruction set may be fully compiled, such as into a machine-executable binary; partially compiled into an intermediate language that is subsequently fully compiled; interpreted from text, etc. The instruction may be executed natively on a processor; through a parser, advanced programming interface (API), or in a virtual machine; within another application or process, such as a web browser; etc. The details are not important, so long as the instruction is able to operate a computer to achieve the desired functional result.

"Computer-Readable Medium" is suggested to mean a computer-operable component capable of transmitting stored data to a computer. The medium may be comparatively static, such as a solid-state storage device, or comparatively volatile, such as system RAM. The medium may be a set of hardware components, such as one or more registers or capacitors; may comprise a fixed medium, such as a platter in a hard disk drive; may comprise a removable medium, such as a CD-ROM in a CD-ROM drive; etc. The medium may be read-only; write-only; both readable and writable; etc. The medium may be read-once; read-many; write-once; write-many; etc. The medium may be accessible in any suitable fashion, such as randomly; sequentially; either randomly or sequentially; etc. The medium may be dedicated to a particular computer or device; may be simultaneously connected to and shared by multiple computers or devices; may be shared over a network; etc. The medium may store the data in any electronic medium, such as electronic, magnetic, optical, print, etc. The medium may be used to store data for a single task or application; may be used to store data for many tasks and applications; etc. The implementation of the medium is not important, so long as the medium is computer-operable and capable of transmitting stored data to a computer.

"Data Representation" is suggested to mean data stored in a memory and/or computer-readable medium that represents or describes, in whole or in part, a concept or object. The concept or object so represented may be a tangible item, such as a person; or an abstract concept, such as a specific mathematical value; or a computer-operable object, such as an image. "Data representation" is particularly suggested to mean image data, which a computer may use to render a specific image. "Data representation" is also particularly suggested to mean data that represents information in the form of text and abstract objects.

"Memory" is suggested to mean a computer-operable component capable of storing and/or retrieving data. The memory may be comparatively static, such as a solid-state storage device, or comparatively volatile, such as system RAM. The memory medium may be a set of hardware components, such as one or more registers or capacitors; may utilize a fixed medium, such as a platter in a hard disk drive; may utilize a removable medium, such as a CD-ROM in a CD-ROM drive; etc. The memory may be read-only; write-only; both readable and writable; etc. The memory may be read-once; read-many; write-once; write-many; etc. The memory may be accessible in any suitable fashion, such as randomly; sequentially; either randomly or sequentially; etc. The memory may be dedicated to a particular computer or device; may be simultaneously connected to and shared by multiple computers or devices; may be shared over a network; etc. The memory may store the data in any computer-accessible medium, such as electronic, magnetic, optical, print, etc. The memory may be used to store data for a single task or application; may be used to store data for many tasks and applications; etc. The implementation of the computer-operable component is not important, so long as the computer-operable component is capable of storing and/or retrieving data.

BRIEF DESCRIPTION OF THE DRAWINGS

Preferred embodiments of the present invention will be described below in more detail, with reference to the accompanying drawings, in which.

DETAILED DESCRIPTION OF THE INVENTION

A preferred embodiment of the present invention is a computer-implemented system and method means in a novel and unobvious combination with a nationwide alliance of professional car care enterprises for remarketing privately owned motor vehicles.

It should be appreciated that the particular implementations shown and described herein are illustrative of the invention and its best mode and are not intended to otherwise limit the scope of the present invention in any way. Indeed, for the sake of brevity, conventional data networking, processor-executable instruction, and other functional aspects of the computer-implemented system (and components of the individual operating components of the computer-implemented system) may not be described in detail herein. It should be noted that many alternative or additional functional relationships or physical connections can be present in a practical computer-implemented system.

Figure 1:
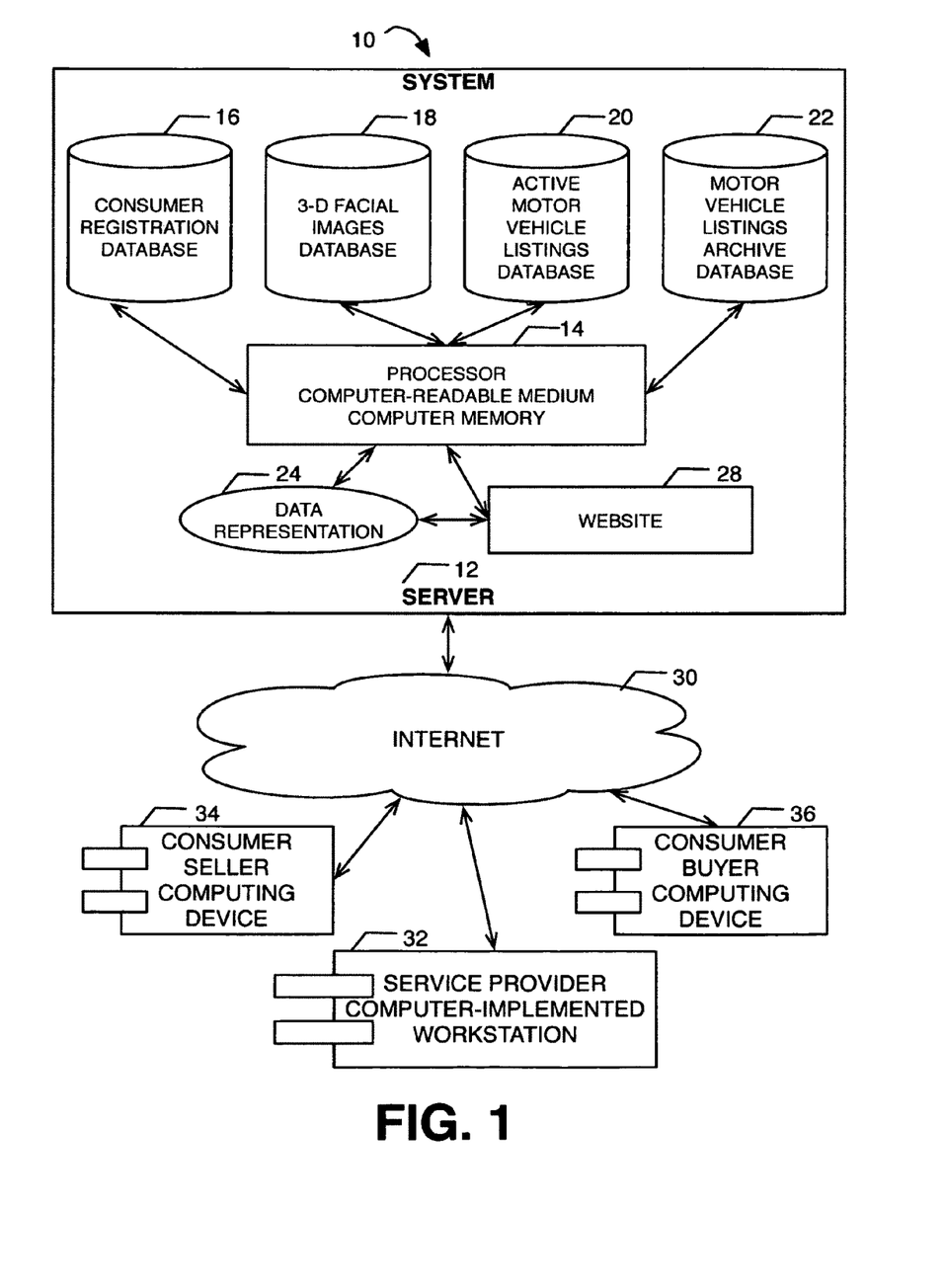
FIG. 1 depicts a functional block diagram illustrating a system 10 architecture for marketing a privately owned motor vehicle according to an example embodiment of the present invention.
Figure 8:
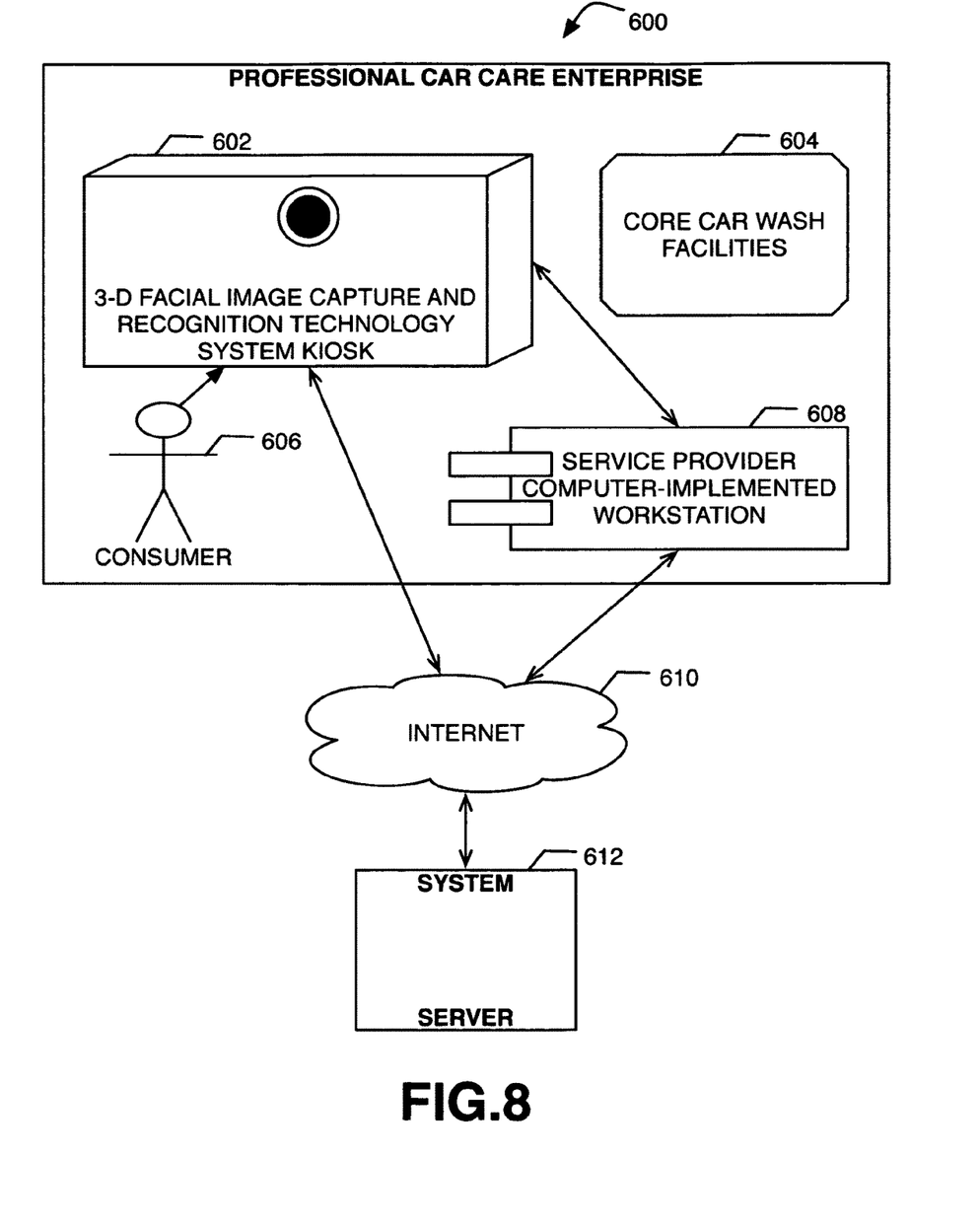
FIG. 8 depicts a functional block diagram illustrating a professional car care enterprise 600 infrastructure for capturing a three-dimensional facial image of a consumer for processing within the system, and as used for other functional steps.

One skilled in the art will appreciate that the electronic commerce network can include any system for exchanging data or transacting business, such as the Internet, an intranet, an extranet, WAN, LAN, VPN, satellite communications, and/or the like. As FIG. 1 illustrates, a consumer 34, 36, and a participating service provider 32 can interact with the system 10 via any input device such as a keyboard, mouse, Internet kiosk, personal digital assistant, handheld computer (e.g., Palm Pilot™), cellular phone, and/or the like. Moreover, as FIG. 8 illustrates, a consumer 606 can interact with the system 612 via a three-dimensional facial image capture and recognition technology system kiosk 602. Similarly, the invention could be used in conjunction with any type of personal computer, laptop, notebook, hand held computer, set-top boxes, network computer, workstation, minicomputer, mainframe, or the like running any operating system such as any version of Windows, Windows NT, Windows 2000, Windows 98, Windows 95, MacOS, OS/2, MacOS X, BeOS, Linux, UNIX, or the like. Moreover, although the invention in its best mode can be implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

In its best mode for interaction with the system, the participating service provider of a professional car care enterprise, FIG. 8, 600, can have a computing workstation implemented in the form of a client, although other implementations are possible. As FIG. 8 illustrates, the computer-implemented workstation 608 can be directly connected to the system 612 which supports the client-server via the Internet 610, intranet, extranet, WAN, LAN, satellite communications, and/or the like, although, in its best mode, by a secure connection such as a VPN.

As FIG. 1 illustrates, in its best mode for interaction with the system 10, the consumer can utilize a computing device 34, 36, in the form of a personal computer, although other types of computing unit may be used, including laptop, notebook, hand held computer, Mac computer, set-top box, Internet kiosk, personal digital assistant, handheld computer (e.g., Palm Pilot™), cellular phone, and/or the like. Similarly, the invention could be used in conjunction with any type of network computer, workstation, minicomputer, mainframe, or the like. The computing devices of the consumer are connected via a data communication network. The network is a public network and assumed to be insecure and open to eavesdroppers, such as the Internet 30. In this context, the computers may or may not be connected to the Internet at all times. For instance, the consumer computer may employ a modem or broadband connection to occasionally connect to the Internet, whereas the participating service provider's enterprise computer-implemented workstation might maintain a permanent connection.

As FIG. 1 illustrates, the electronic commerce system can be implemented by the computer-implemented system 10 which supports the client-server 12. The electronic commerce system can be implemented as computer software modules loaded onto the service provider's enterprise computer-implemented workstation 32 and the consumer computing devices 34, 36, or as HTML code through a web browser, although other implementations are possible. The service provider's enterprise computer-implemented workstation nor the consumer computing device necessarily requires any additional software or HTML code to participate in the online commerce transactions supported by the online commerce system other than a login passcode and/or other personal identifier.

As will be appreciated by one of ordinary skill in the art, the present invention can take an embodiment combining aspects of both software and hardware. Furthermore, as FIG. 1 illustrates, the present invention can take the form of a computer-readable storage medium 14 having computer-readable program code means embodied in the storage medium. Any suitable computer-readable storage medium can be utilized, including hard disks, CD-ROM, optical storage devices, magnetic storage devices, and/or the like.

The present invention is described according to various aspects of the invention. It will be understood that various aspects of the invention can be implemented by processor-executable instructions. As FIG. 1 illustrates, these processor-executable instructions can be loaded onto a general purpose computer, special purpose computer, system processor 14 or other programmable data processing apparatus to produce a machine, such that the instructions which execute on the computer or other programmable data processing apparatus create means for implementing the functions specified.

As FIG. 1 illustrates, these processor-executable instructions can also be stored in a computer-readable memory 14 that can direct a computer or other programmable data processing apparatus to function in a particular manner, such that the instructions stored in the computer-readable memory produce an article of manufacture including instruction means which implement the function specified. The processor-executable instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Embodiments of the present invention can include a signal containing code or computer data signal embodied in a carrier wave which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

Embodiments of the present invention can include a computer-implemented method for transmitting code or computer data signal embodied in a carrier wave which can be executed at a computer to perform any of the processes of embodiments of the present invention. As FIG. 1 illustrates, the transmitting can include transfer through any portion of a network, such as the Internet 30; through wires, the atmosphere or space; or any other type of transmission. The transmitting can include initiating a transmission of code or computer data signal embodied in a carrier wave; or causing the code or computer data signal embodied in a carrier wave to pass into any region of the United States from another region of the United States. A transmission to a user can include any transmission received by the user in any region of the United States, regardless of the location from which the transmission is sent.

Accordingly, the system and method including electronic commerce support combinations of means for performing the specified functions, combinations of steps for performing the specified functions, and processor-executable instruction means for performing the specified functions. It will also be understood that the computer-implemented system and method including electronic commerce can be implemented by either special purpose hardware-based computer systems which perform the specified functions or steps, or suitable combinations of special purpose hardware and processor-executable instructions.

Communication between the parties to the transaction and the system of the present invention is accomplished through any suitable communication means, such as, for example, a telephone network, Intranet, Internet, point of interaction device (point of sale device, personal digital assistant, cellular phone, three-dimensional facial image capture and recognition technology system kiosk, Internet kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The professional car care industry comprises: a nationwide alliance of professional car care enterprises, including: Car Washes; Truck and Bus Washes; Car Detailing Shops; Mobile Car, Truck and Bus Washes; Mobile Car Detailing; Self-Service Carwashes; Waxing and Polishing of Motor Vehicles, and; further including any current, future and new type of professional car care enterprise not listed heretofore. The nationwide alliance of professional car care enterprises can provide the brick-and-mortar infrastructure, FIG. 8, 600, where both the initial and final steps and functions involved in the remarketing of a privately owned motor vehicle take place. In its best mode, the steps and functions involved in the remarketing process are facilitated, in part, by the participating service provider of the respective professional car care enterprise.

As FIG. 1 illustrates, the electronic commerce comprises: a multi-protocol, wide-area network including an interactive, service-mark branded, online computer-implemented system 10 with databases 16, 18, 20, 22, a server 12, and a website 28 registered in a domain on the world-wide-web, and a nationwide alliance of professional car care enterprise computer-implemented workstations 32, further including computer-implemented system and computer-implemented workstation computer-readable medium 14 to accomplish, by employing processor-executable instruction thereon, the uploading of data representation 24 consisting of subject motor vehicle information, including motor vehicle digital photographs, motor vehicle specification and condition information, along with seller contact information, and consumer registration information including digital personal identification photographs, three-dimensional facial images, or the like, by transmitting code or computer data signal embodied in a carrier wave onto the system central database for assimilation, batching, indexing, and processing, in preparation for subsequent retrieval and usage thereof in accordance with the system and method described herein.

Advantages

With the intention of attracting the most interest and increasing perceived value, a presumption exists that a privately owned motor vehicle will be cleaned as thoroughly as possible, inside and out before being placed on the market. From the description above, the advantages of the motor vehicle remarketing service are synergistically apparent. The system and method means in a novel and unobvious combination with a nationwide alliance of professional car care enterprises provides: a marriage that enables the thousands of brick-and-mortar professional car care enterprises to morph into one hybrid model; a physical infrastructure integral to the process of buying and selling used motor vehicles; a national platform for educating an ecologically and environmentally conscious society of the green-benefits of professional car care versus individual car care alternatives; and a branded service that is national in its reach while local in its execution.

Operation

Figure 3:
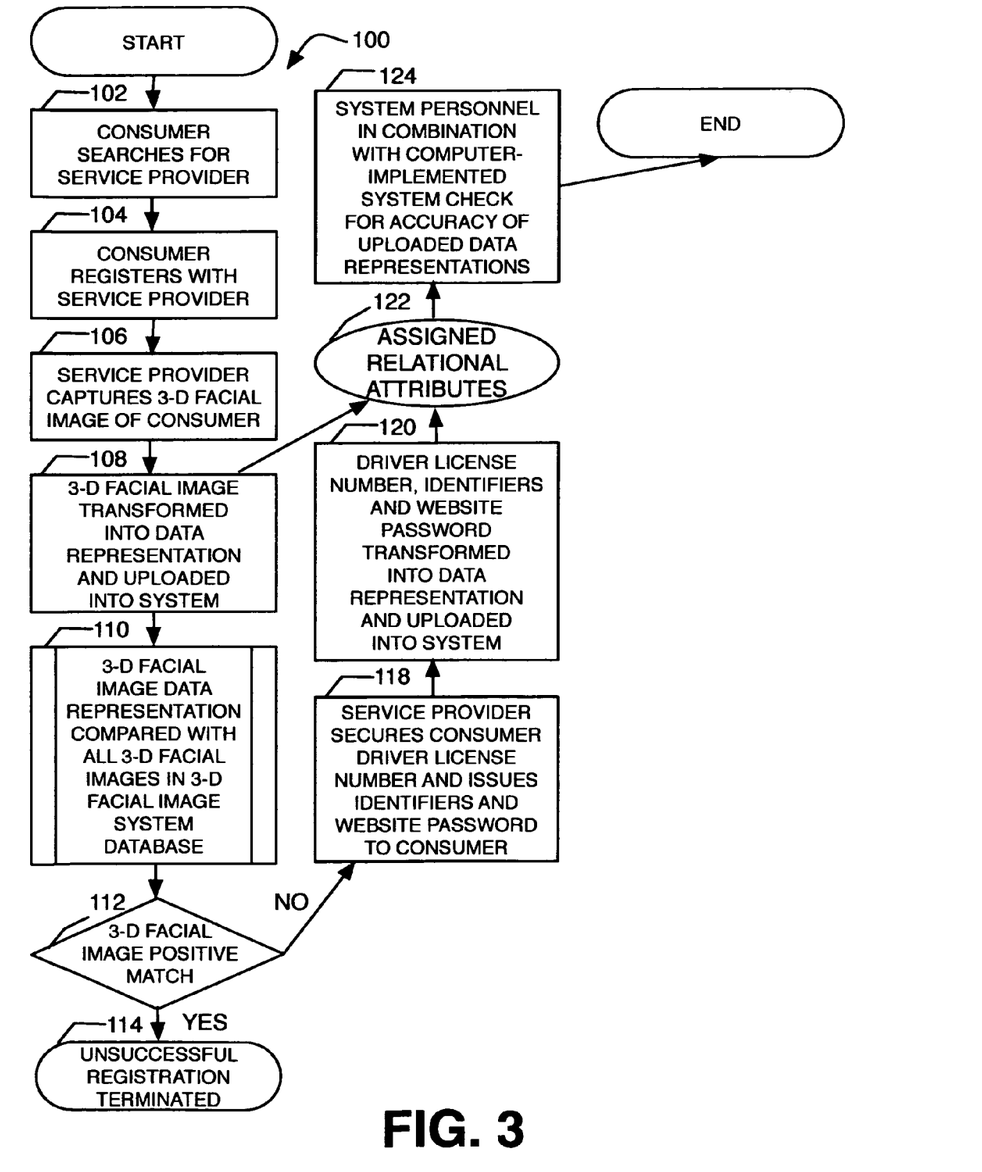
FIG. 3 depicts a flowchart illustrating a method 100 for consumer registration with the system.

A consumer searches, FIG. 3, 102, with a computing device, FIG. 1, 34, 36, for an interactive, service-mark branded, online website, FIG. 1, 28, registered in a domain for electronic commerce on a world wide web to find an address for a physical location of a participating professional car care enterprise, FIG. 8, 600, within a nationwide alliance of professional car care enterprises or by physically searching in a local geographic area to find a participating professional car care enterprise within the nationwide alliance.

A consumer registers, FIG. 3, 104, with a participating service provider at a professional car care enterprise, FIG. 8, 600, within the nationwide alliance of professional car care enterprises.

The consumer registration procedure is accomplished in several steps, first, by the service provider capturing a three-dimensional facial image of the consumer, FIG. 3, 106, FIG. 8, 606, with a three-dimensional facial image capture and recognition technology system kiosk, FIG. 8, 602, located at the professional car care enterprise, FIG. 8, 600.

The service provider, by employing a combination of processor-executable instruction, computer memory, and computer-readable medium present on the enterprise computer-implemented workstation, FIG. 8, 608, or as processed directly through the three-dimensional facial image capture and recognition technology system kiosk, FIG. 8, 602, transforms the three-dimensional facial image captured from said consumer into data representation, and uploads said data representation by means of transmitting a signal code or a computer data signal embodied in a carrier wave into the computer-implemented system, FIG. 3, 108, FIG. 8, 610, 612, utilizing an assigned, encrypted, service-provider identification code.

The three-dimensional facial image captured from the consumer is processed into the three-dimensional facial images system database, FIG. 1, 18, and is analyzed in comparison to all three-dimensional facial images secured in the three-dimensional facial images system database, FIG. 3, 110, by employing a combination of processor-executable instruction, computer memory, and computer-readable medium, FIG. 1, 14, present in the system, or as processed directly through the three-dimensional facial image capture and recognition technology system kiosk, FIG. 8, 602, 610, 612, to determine whether said consumer has already registered with the computer-implemented system under an alias name and/or driver license number.

In the event the three-dimensional facial image comparison results in a positive match, FIG. 3, 112, with said consumer being registered under an alias name and/or driver license number, the consumer registration is deemed unsuccessful, and terminated, FIG. 3, 114, at which time said positive match as related to the consumer registration on file, is flagged for further proceedings which may result in a permanent ban of consumer participation with the system.

In the event the three-dimensional facial image comparison is negative, the service provider proceeds to secure the consumer driver license number from the registering consumer, FIG. 3, 118, and said service provider, by employing a combination of processor-executable instruction, computer memory, and computer-readable medium present on the enterprise computer-implemented workstation, FIG. 8, 608, or as processed directly through the three-dimensional facial image capture and recognition technology system kiosk, FIG. 8, 602, transforms said consumer driver license number along with date of entry, into data representation, and uploads said data representation by means of transmitting a signal code or a computer data signal embodied in a carrier wave into the consumer registration system database, FIG. 1, 16, the data representation to be associated with the three-dimensional facial image of consumer on file, utilizing an assigned, encrypted, service-provider identification code.

The successfully registered consumer is issued a system website password and/or other relational identifier by the service provider, FIG. 3, 118; said password and/or other relational identifier associated with the consumer registration on file, and said service provider, by employing a combination of processor-executable instruction, computer memory, and computer-readable medium present on the enterprise computer-implemented workstation, FIG. 8, 608, or as processed directly through the three-dimensional facial image capture and recognition technology system kiosk, FIG. 8, 602, transforms said consumer system website password and other relational identifier into data representation, and uploads by means of transmitting a signal code or a computer data signal embodied in a carrier wave into the consumer registration system database, FIG. 1, 16, the data representation to be associated with the three-dimensional facial image of consumer on file, utilizing an assigned, encrypted, service-provider identification code.

Once the service provider has uploaded the data representation into the system, system personnel may visually review and/or can employ a combination of processor-executable instruction, computer memory, and computer-readable medium, FIG. 1, 14, present in the system, to review the data representation in order to verify that the data representation has been correctly formatted, and that the data representation reflects the consumer three-dimensional facial image, the consumer driver license number, the consumer system website password and/or other relational identifier, and the date of entry into the system, FIG. 3, 124.

Figure 4:
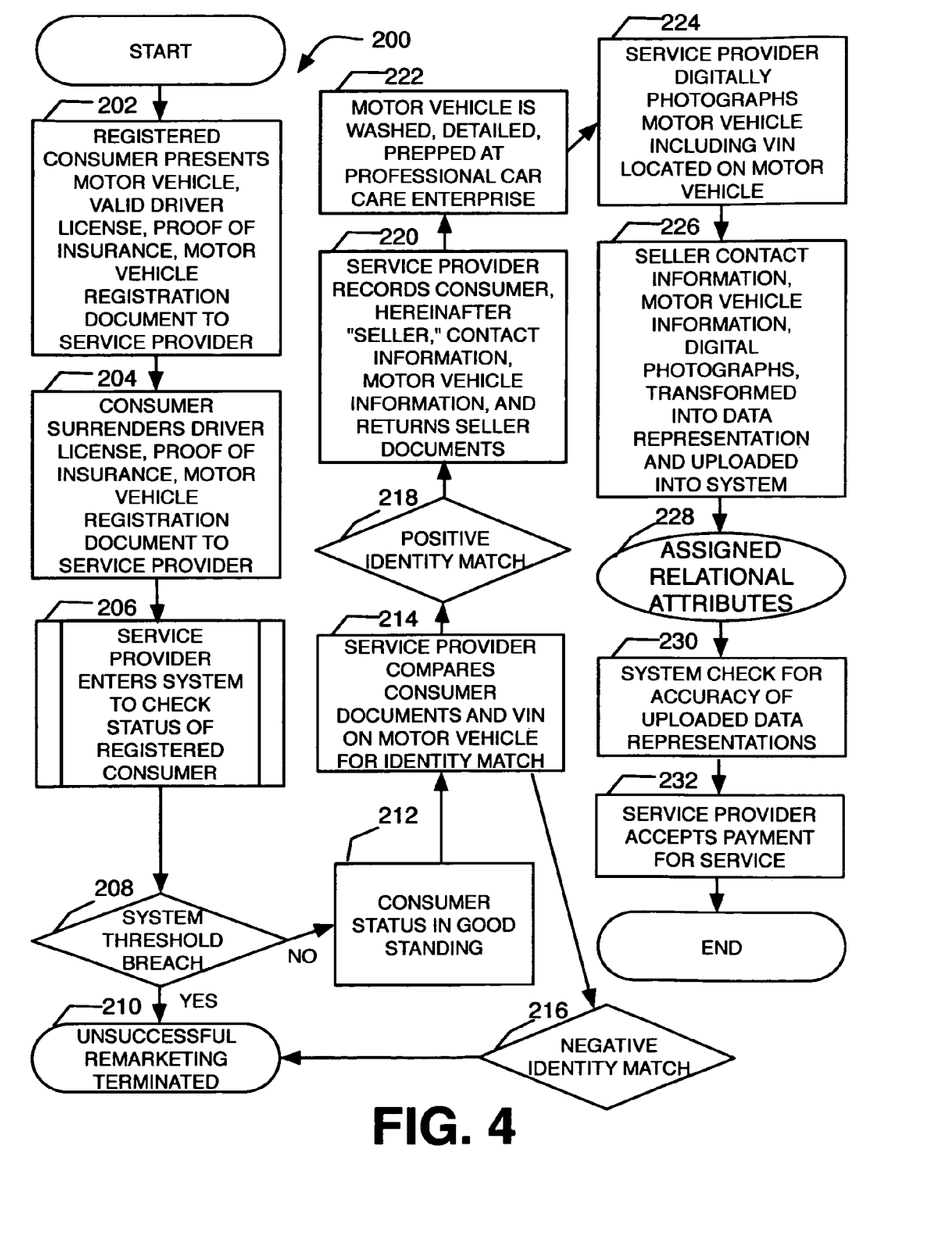
FIG. 4 depicts a flowchart illustrating a method 200 for the initial marketing steps of a motor vehicle with the system.

A registered consumer markets a motor vehicle by presenting a motor vehicle along with a valid driver's license, proof of insurance, and motor vehicle registration document to any one of the thousands of participating service providers, FIG. 4, 202, of professional car care enterprises within the nationwide alliance of professional car care enterprises or, in exercising the option of initiating the remarketing process at another designated location, seeking the services of a participating mobile-wash or mobile-detailing enterprise.

The consumer physically surrenders a driver license, proof of insurance, and motor-vehicle registration document to the service provider, FIG. 4, 204.

The service provider enters the consumer driver license number and/or other consumer registration relational identifier into the enterprise computer-implemented workstation, FIG. 8, 608, in order to retrieve by computer data signal embodied in a carrier wave the consumer registration status within the system, FIG. 4, 206. In the event the registered consumer status is in good standing, in other words, said consumer has not exceeded system thresholds (said thresholds as developed, set, and revised by researching and analyzing evolving average private owner motor vehicle selling and/or purchasing frequency, type of transaction, price range, age of motor vehicle, and other relevant factors related to participation in the used car market) resulting in conclusion that consumer is deemed not to be a used car dealer, used car broker, or curbstoner, the service provider proceeds with the remarketing process, FIG. 4, 212. In the event the registered consumer has breached the system threshold, FIG. 4, 208, the remarketing process is deemed unsuccessful and is terminated, FIG. 4, 210.

The service provider visually compares the name on the consumer driver license and proof of insurance with the name on the motor-vehicle registration document, FIG. 4, 214.

The service provider visually compares the number on the motor-vehicle registration document to the Vehicle Identification Number (VIN) physically located on said motor vehicle in manufacturer designated areas, FIG. 4, 214.

In the event that the identity on the consumer driver license, proof of insurance, and motor-vehicle registration documents visually match each other along with a visual match of the number on the motor-vehicle registration document and the VIN physically located on the motor vehicle in manufacturer designated areas, FIG. 4, 218, the service provider then records, FIG. 4, 220, the VIN, year, make, model, color, odometer-reading, consumer contact information, other possible motor vehicle information, and the consumer registration relational identifier, along with the date of entry into the enterprise computer-implemented workstation, FIG. 8, 608, in a desired format. In the event that the identity on the consumer driver license, proof of insurance, and motor-vehicle registration documents do not visually match each other and/or do not visually match the number on the motor-vehicle registration document and the VIN physically located on said motor vehicle in manufacturer designated areas, FIG. 4, 216, the remarketing process is deemed unsuccessful and is terminated, FIG. 4, 210.

The service provider physically returns the consumer, hereinafter described as "seller," driver license, proof of insurance, and motor-vehicle registration document, FIG. 4, 220.

The motor vehicle is then washed, detailed or, otherwise, prepped, FIG. 4, 222, by said service provider using the core car wash facilities of the professional car care enterprise, FIG. 8, 604.

Once the motor vehicle has been washed, detailed or, otherwise, prepped, the service provider digitally photographs said motor vehicle interior and exterior, including the VIN physically located on said motor vehicle in manufacturer designated locations, with a digital camera, FIG. 4, 224, and loads the digital photographs into the enterprise computer-implemented workstation by utilizing a digital camera/workstation electronic adaptor.

The service provider ascertains whether the seller wishes the motor vehicle to be placed in the computer-implemented system in a classified advertisement format or in an auction format and, depending on which format, any asking price or reserve.

The service provider sets the desired format, and records and formats any additional, relevant information into the enterprise computer-implemented workstation.

The service provider performs a final verification of the accuracy of the information obtained from the seller, and confirms that the digital photographs of the motor vehicle and motor vehicle VIN are placed in accompaniment with the information obtained from the seller.

The service provider, by employing a combination of processor-executable instruction, computer memory, and computer-readable medium present on the enterprise computer-implemented workstation, transforms the motor vehicle information, seller contact information, accompanying motor vehicle digital photographs, and the consumer registration relational identifier, along with the date of entry into the enterprise computer-implemented workstation, into data representation, and uploads said data representation by means of transmitting a signal code or a computer data signal embodied in a carrier wave into the system, FIG. 4, 226, FIG. 8, 608, 610, 612, utilizing an assigned, encrypted, service-provider identification code.

Once the service provider has uploaded the data representation into the system, website personnel may visually review and/or can employ a combination of processor-executable instruction, computer memory, and computer-readable medium, FIG. 1, 14, present in the system, to review the data representation in order to verify that the data representation has been correctly formatted, that the data representation reflects seller contact information, the VIN, year, make, model, color and odometer-reading of the motor vehicle, and the consumer registration relational identifier, also confirming that the digital photographs of said motor vehicle and VIN are in accompaniment therewith, FIG. 4, 230, and that by means of a combination of processor-executable instruction, computer memory, and computer-readable medium present in the system, the seller data representation, FIG. 1, 24, on file has been properly linked by the consumer registration relational identifier to the consumer registration on file in the consumer registration system database, FIG. 1, 16.

Upon completion of the process, payment for the service can be accepted, FIG. 4, 232.

All consumers have limited access to the system website, FIG. 1, 28, by employing a personal or other computing device to browse and/or utilize embedded search engines to locate a motor vehicle of interest, FIG. 1, 34, 36. No consumer may be allowed access to motor vehicle seller name or contact information unless and until the consumer successfully registers with the system.

A registered consumer secures unlimited access to the system website, FIG. 1, 28, with a website login password and/or other identifier by employing a personal or other computing device, FIG. 1, 34, 36. Once browsing and/or searching, and locating a particular motor vehicle of interest within said system, FIG. 5, 302, the consumer, hereinafter described as "buyer," can contact the seller by accessing the system central database, FIG. 1, 10, for retrieval of contact information provided by the seller, FIG. 5, 304. Buyer and seller can subsequently arrange a meeting at a participating professional car care enterprise, FIG. 8, 600, during normal business hours, for inspection of the motor vehicle, test-drive, negotiation, and final exchange, FIG. 5, 304.

Before proceeding to a participating professional car care enterprise, buyer and seller can access the system website, FIG. 1, 28, with a website login password and/or other identifier by employing a personal or other computing device, FIG. 1, 34, 36, to ascertain whether their own registration status is in good standing. If buyer or seller find that one is not in good standing, the system cannot sanction the meeting, whereby an unsanctioned meeting at a professional car care enterprise may be avoided.

Figure 5:
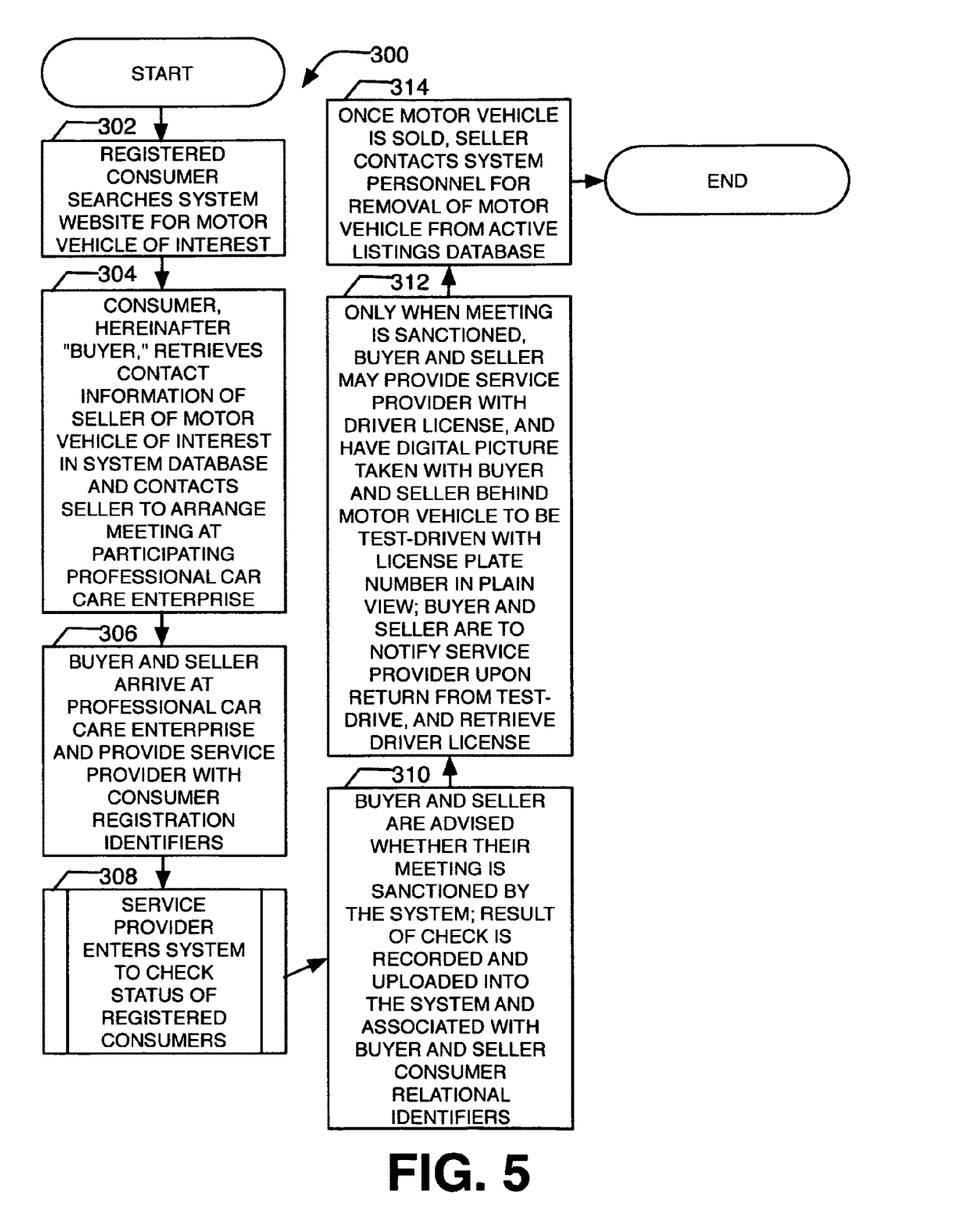
FIG. 5 depicts a flowchart illustrating a method 300 for the final marketing steps of a motor vehicle with the system.

Upon buyer and seller arrival at the participating professional car care enterprise, buyer and seller provide consumer registration identifiers to the service provider, FIG. 5, 306.

The service provider, by employing a combination of processor-executable instruction, computer memory, and computer-readable medium present on the enterprise computer-implemented workstation, accesses the system, FIG. 1, 10, by means of transmitting a signal code or a computer data signal embodied in a carrier wave into the system, utilizing an assigned, encrypted, service-provider identification code, and enters the buyer and seller consumer registration identifiers to check whether buyer and seller registration status is in good standing, FIG. 5, 308. Buyer and seller are subsequently informed of the results, and whether the meeting is sanctioned by the system; said results are recorded in the system and associated with the buyer and seller consumer registration relational identifiers, FIG. 5, 310.

For enhanced security, registered consumers in good standing may utilize the option of providing the service provider with photo-identification, that is to say, a driver license and current contact information before going on a test-drive of a motor vehicle. This includes the service provider taking a digital photograph, with a digital camera, of the buyer and the seller behind the motor vehicle to be test-driven, with the motor vehicle license plate number in plain view, said digital photograph, driver license and contact information being secured by the service provider until such a time of the return from the test drive, at which time the party of the test-drive is to inform the service provider of the return, and retrieve driver license and contact information left with the service provider, FIG. 5, 312. Identification documents may be scanned and contact particulars may be recorded by date, time, and location, stored in the system central database, FIG. 1, 10, by means of the enterprise computer-implemented workstation, FIG. 8, 608, and maintained for a designated time after completion of the meeting, test-drive and consummation, if any, of final exchange.

Once the privately owned motor vehicle has been sold, the seller may contact system personnel by telephone, email, or by other available communication methods, and upon providing system personnel with the seller's consumer registration relational identifier, may request immediate removal of the active listing, FIG. 5, 314, thus, virtually eliminating dated inquiries.

Figure 6:
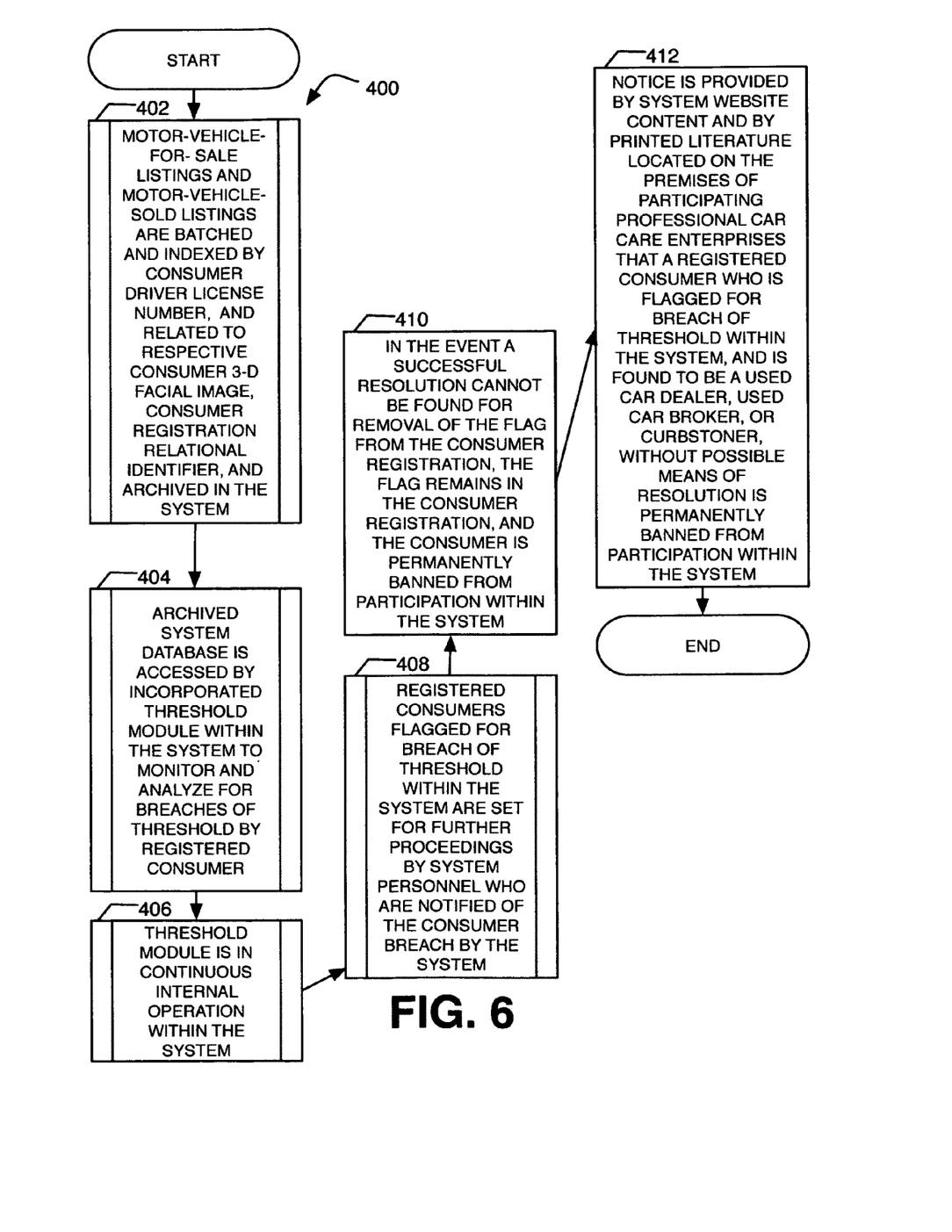
FIG. 6 depicts a flowchart illustrating a method 400 within the system to monitor patronage, and identify, isolate, ban, and enforce the express prohibition of used car dealer, used car broker, and curbstoner participation within the system, in any fashion.

A record of every listing of a privately owned motor vehicle for sale, and consummated sale in the system, FIG. 1, 10, is batched, indexed by consumer driver license number and/or other relational identifier, related to the respective consumer three-dimensional facial image, and archived with personal identification information of the buyer and seller, FIG. 6, 402, by employing a combination of processor-executable instruction, computer memory, and computer-readable medium, FIG. 1, 14, present in the system, which is associated by consumer registration relational identifier to buyer and seller consumer registration files in the system.

A threshold module is developed, set, and revised by researching, analyzing, and combining evolving factors of average private owner motor vehicle selling and/or purchasing frequency, type of transaction, price range, age of motor vehicle, and other relevant factors related to participation in the used car market.

The threshold module is incorporated into a combination of processor-executable instruction, computer memory, and computer-readable medium, FIG. 1, 14, present in the system by which the batched, indexed, and related archive is monitored and analyzed for breaches of the threshold by registered consumer, FIG. 6, 404.

The threshold module is in continuous internal operation within the system, FIG. 6, 406, as a method to monitor the patronage and thus, identify, isolate, ban, and enforce the express prohibition of used car dealer, used car broker, and curbstoner participation within the system, FIG. 1, 10, in any fashion, against those who may ignore the express prohibition of participation and attempt to utilize the service by means of subterfuge or deception.

In the event a registered consumer has breached the threshold, the consumer registration is flagged by the computer-implemented system. By means of a combination of processor-executable instruction, computer memory, and computer-readable medium, FIG. 1, 14, present in the system, website personnel can be notified so that website personnel can conduct follow-up investigation with the registered consumer in an independent attempt to resolve and/or confirm the cause for the flag, FIG. 6, 408. In the event a successful resolution cannot be found for removal of the flag from the consumer registration, the flag remains in the consumer registration, and the consumer is permanently banned from participation within the system, FIG. 6, 410.

Three-dimensional facial images are batched and indexed by consumer driver license number and/or other relational identifier, and are archived in the three-dimensional facial images system database, FIG. 7, 502, FIG. 1, 18.

Figure 7:
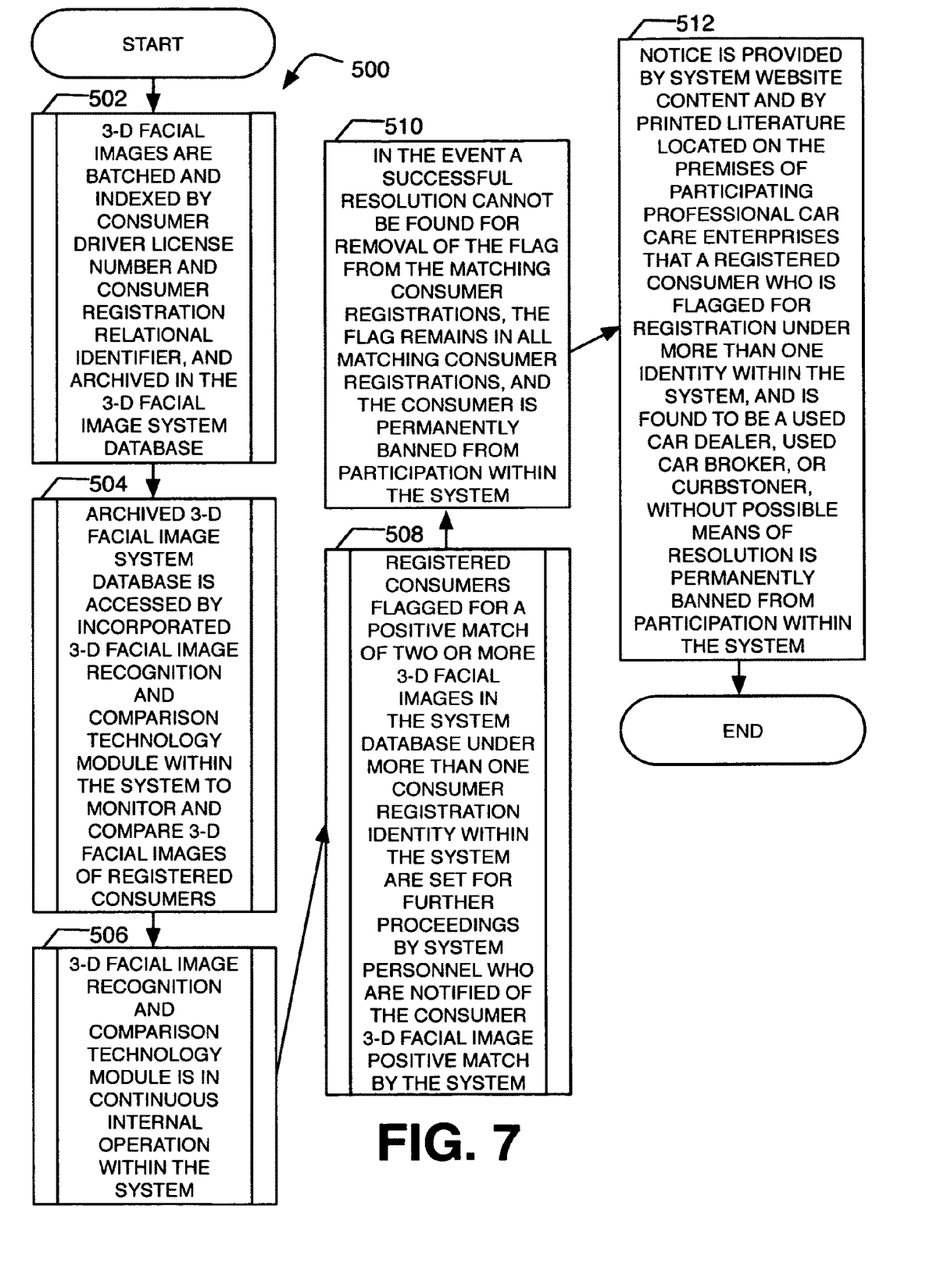
FIG. 7 depicts a flowchart illustrating a method 500 within the system to monitor patronage, and identify, isolate, ban, and enforce the express prohibition of used car dealer, used car broker, and curbstoner participation within the system, in any fashion.

A three-dimensional facial image recognition and comparison technology module is incorporated into a combination of processor-executable instruction, computer memory, and computer-readable medium, FIG. 1, 14, present in the system by which the batched, indexed, and related archive, three-dimensional facial images are monitored and compared for a possible positive match of two or more three-dimensional facial images under more than one consumer registration identity, FIG. 7, 504.

By means of a combination of processor-executable instruction, computer memory, and computer-readable medium, FIG. 1, 14, present in the system, as incorporated with a three-dimensional facial image recognition and comparison technology module, the module is in continuous internal operation within the system, FIG. 7, 506, as a method to monitor, and compare the three-dimensional facial images of registered consumers and thus, identify, isolate, ban, and enforce the express prohibition of used car dealer, used car broker, and curbstoner participation within the system, in any fashion, against those who may ignore the express prohibition of participation and attempt to utilize the service by means of subterfuge or deception.

In the event the three-dimensional facial image recognition and comparison technology module has found a positive match of two or more three-dimensional facial images in the three-dimensional facial images system database under more than one consumer registration identity, all three-dimensional facial images involved in the positive match are flagged by the system, FIG. 7, 508. By means of a combination of processor-executable instruction, computer memory, and computer-readable medium, FIG. 1, 14, present in the system, website personnel can be notified so that website personnel can conduct follow-up investigation with the registered consumer in an independent attempt to resolve and/or confirm the cause for the flag, FIG. 7, 508. In the event a successful resolution cannot be found for removal of the flag from the matching consumer registrations, the flag remains in all matching consumer registrations, and the consumer, under all registered identities, is permanently banned from participation with the system, FIG. 7, 510.

Figure 2:
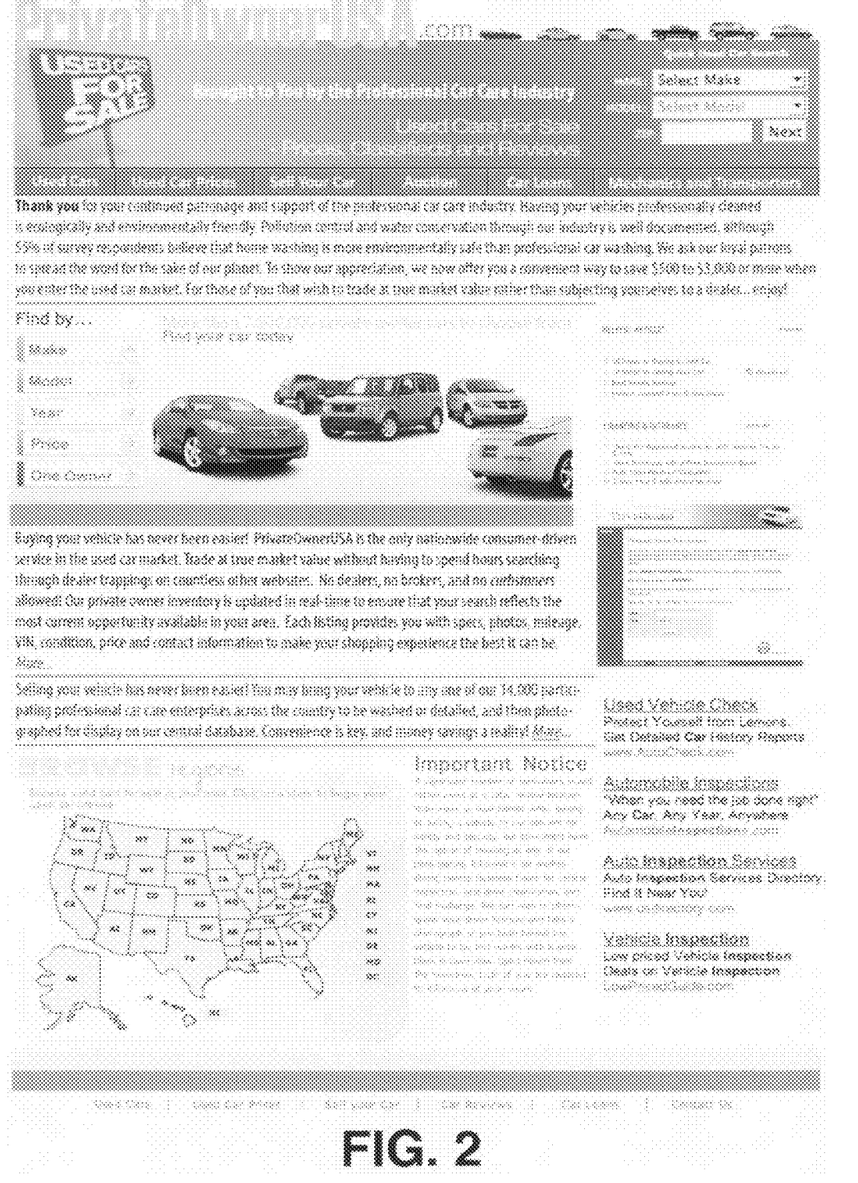
FIG. 2 depicts a screenshot of the website of FIG. 1 according to an example embodiment of the present invention.

Notice is provided by system website content, FIG. 2, and by printed literature located on the premises of participating professional car care enterprises that a registered consumer who is flagged for breaching the threshold, FIG. 6, 412, or registered under more than one identify within the system, FIG. 7, 512, and is found to be a used car dealer, used car broker, or curbstoner, without possible means of resolution is permanently banned from participation within the system.

CONCLUSIONS, RAMIFICATIONS, AND SCOPE

Accordingly, the consumer has access to a branded service that is national in its reach while local in its execution whereby a privately owned motor vehicle is initially placed on the market in a quick, convenient, one-stop process. The electronic commerce enables the thousands of brick-and-mortar professional car care enterprises, which comprise the nationwide alliance, to morph into one hybrid model. The present invention provides the physical infrastructure integral to the process of buying and selling used motor vehicles. In accordance with tips for safety and crime prevention, the present invention has in place a method of documenting consumer meetings while providing a relatively safe and neutral location whereby consumers may meet to inspect, negotiate and finalize an exchange. The present invention has in place a method to quickly identify and enforce the prohibition against used car dealer, used car broker, and curbstoner participation within the system, in any fashion. It also provides a branded service whereby consumers may arrive at true market value for a given motor vehicle by means of exclusive, real-time-inventory listings of privately owned motor vehicles and, finally, it provides a national platform for green-marketing the benefits of professional car care versus individual car care alternatives to an ecologically and environmentally conscious society.

Once the invention has established brand awareness, credibility, and reliability, the invention may ramify as a free tool to drive the core competency of the professional car care industry to a new level of efficiency and productivity. In other words, the invention may morph into a no-charge incentive and inducement (e.g., car wash club) for loyal patronage of the professional car care industry. Consequently, this type of incentive and inducement may ultimately contribute to expansion of the core market to mainstream consumers.

Once the invention is in operation, a determination may be made that in order for the system and method of to work more efficiently and expeditiously, the order of processes, steps, and functions, as described above, may require changes, additions or eliminations. As an example, the process of taking digital photographs of a motor vehicle may be changed to taking streaming video so that the exterior of the motor vehicle may be rotated 360 degrees, a door(s) opened, and the interior of the motor vehicle rotated 360 degrees, in one fluid motion during a consumer's search for, and initial viewing of a motor vehicle of interest on the online site. Thus, the scope of the invention should be determined by the appended claims and their legal equivalents rather than by the examples given.

The forgoing description of preferred embodiments of the present invention has been provided for the purposes of illustration and description. It is not intended to be exhaustive or to limit the invention to the precise forms disclosed. Many modifications and variations can be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It will also be appreciated that various presently unforeseen or unanticipated alternatives, modifications, variations or improvements therein may be subsequently made by those skilled in the art which are also intended to be encompassed by the disclosed embodiments. It is intended that the scope of the invention be defined by the claims and their equivalents.

What is claimed is:

1. A method for remarketing privately owned motor vehicles by consumers through a nationwide alliance of professional car care service providers, said method comprising:

capturing by the service providers using alliance computer workstations three-dimensional facial images of sellers desiring to sell their privately owned motor vehicles and uploading the three-dimensional facial images to a database managed by a nationwide alliance server;

for a given seller, determining a successful registration based upon a negative match of the seller's three-dimensional facial image with existing three-dimensional facial images and issuing to the seller by the participating service provider a system website password and/or other relational identifier;

presenting by the registered seller to the participating service provider, the privately owned motor vehicle, a valid driver license, proof of insurance, vehicle identification number and motor vehicle registration document for the privately owned motor vehicle;

establishing the registered seller as being in good standing by the system by determining a system threshold has not been breached;

confirming a positive match based on the presented documents;

recording by the service provider, the vehicle identification number, year, make, model, color, and odometer reading along with the registered seller, name, contact phone number, and contact email address, along with date of entry, in the alliance computer workstation;

washing, detailing or otherwise prepping the privately owned motor vehicle by the service provider;

taking by the service provider digital photographs of the privately owned motor vehicle, interior and exterior, including the vehicle identification number physically located on said motor vehicle in manufacturer designated areas and uploading by the service provider, the digital photographs and the associated recorded seller information into the service provider's alliance computer workstation;

accepting by the service provider payment from the seller for remarketing services rendered;

uploading by the service provider, the seller formatted information and accompanying digital photographs into the system's central database by said service provider utilizing the alliance computer workstation, utilizing an assigned, encrypted, service provider identification code;

reviewing and verifying by system personnel that the seller formatted information and accompanying digital photographs uploaded by the service provider into the system central database are correctly formatted, with said seller formatted information reflecting said seller name, contact phone number, contact email address, the motor vehicle identification number, year, make, model, color, odometer reading of the motor vehicle, and date of entry into the system; and listing the privately owned motor vehicle for sale on the system website.

2. The method of claim 1 further comprising:

browsing and/or searching by a registered buyer, the system website for a motor vehicle of interest;

contacting by the registered buyer, the seller of a particular motor vehicle of interest by accessing and retrieving said seller contact information associated with said motor vehicle of interest in the system central database;

arranging by the buyer and the seller, a meeting at a service provider during normal business hours, for inspection of the motor vehicle, test-drive, negotiation, and final exchange;

providing by the buyer and the seller, registration identifiers to the service provider upon arrival;

checking by the service provider, the buyer and seller registration status;

informing by the service provider, the buyer and seller whether the meeting is sanctioned by the system results of the buyer and seller registration status check;

providing by sanctioned buyer and seller, a driver license and current contact information to the service provider before leaving for a test-drive of the motor vehicle;

taking by the service provider, with a digital camera, a digital photograph of the buyer and the seller behind the motor vehicle to be test-driven, with the motor vehicle license plate number in plain view;

securing by the service provider, the buyer and seller driver license and current contact information, along with the digital photograph, until the buyer and seller both announce their return to the service provider, and retrieve the driver license and current contact information.

3. The method of claim 1 further comprising:

controlling and exercising by registered buyer and registered seller, directly and exclusively, with the assistance and aide of a participating service provider or system personnel, only as initiated and requested by buyer or seller, said method utility and all available options.

* * * * *